United States Patent
Sharifie et al.

(10) Patent No.: US 9,015,397 B2
(45) Date of Patent: Apr. 21, 2015

(54) METHOD AND APPARATUS FOR DMA TRANSFER WITH SYNCHRONIZATION OPTIMIZATION

(71) Applicants: Tal Sharifie, Lehavim (IL); Shay Benisty, Beer Sheva (IL); Yair Baram, Metar (IL)

(72) Inventors: Tal Sharifie, Lehavim (IL); Shay Benisty, Beer Sheva (IL); Yair Baram, Metar (IL)

(73) Assignee: SanDisk Technologies Inc., Plano, TX (US)

( * ) Notice: Subject to any disclaimer, the term of this patent is extended or adjusted under 35 U.S.C. 154(b) by 256 days.

(21) Appl. No.: 13/767,404

(22) Filed: Feb. 14, 2013

(65) Prior Publication Data

US 2014/0149625 A1 May 29, 2014

Related U.S. Application Data

(60) Provisional application No. 61/731,331, filed on Nov. 29, 2012.

(51) Int. Cl.
*G06F 13/28* (2006.01)
*G06F 11/10* (2006.01)

(52) U.S. Cl.
CPC ............ *G06F 13/28* (2013.01); *G06F 11/1076* (2013.01); *G06F 11/108* (2013.01)

(58) Field of Classification Search
CPC . G06F 13/28; G06F 2212/621; G06F 13/376; G06F 13/366; G06F 13/405
USPC ........................................................ 710/308
See application file for complete search history.

(56) References Cited

U.S. PATENT DOCUMENTS

| | | | | |
|---|---|---|---|---|
| 5,504,858 A | * | 4/1996 | Ellis et al. ..................... | 714/6.24 |
| 5,859,965 A | * | 1/1999 | Gittins et al. .................. | 714/52 |
| 6,151,641 A | * | 11/2000 | Herbert .......................... | 710/22 |
| 7,627,697 B2 | * | 12/2009 | Saito .............................. | 710/22 |
| 8,205,019 B2 | | 6/2012 | Brink et al. | |
| 2003/0120864 A1 | | 6/2003 | Lee et al. | |
| 2005/0223269 A1 | | 10/2005 | Stolowitz | |
| 2006/0123271 A1 | | 6/2006 | Forhan et al. | |
| 2007/0073915 A1 | * | 3/2007 | Go et al. ......................... | 710/11 |
| 2007/0073925 A1 | | 3/2007 | Lim et al. | |
| 2007/0079017 A1 | | 4/2007 | Brink et al. | |
| 2008/0016300 A1 | * | 1/2008 | Yim et al. ...................... | 711/162 |
| 2013/0013566 A1 | * | 1/2013 | Miller et al. ................... | 707/655 |

FOREIGN PATENT DOCUMENTS

WO    WO 2004/023291 A1    3/2004

* cited by examiner

*Primary Examiner* — Glenn A Auve
*Assistant Examiner* — Phong H Dang
(74) *Attorney, Agent, or Firm* — Brinks Gilson & Lione

(57) ABSTRACT

A DMA optimization circuit transfers data from a single source device to a plurality of destination devices on a computer bus. A first DMA control circuit is configured to transfer a payload of data from the source device to a first destination device where the payload of data divided into a plurality of chunks of data. A second DMA control circuit is configured to transfer the payload of data from the source device to a second destination device, and is further configured to perform a logical operation on the data transferred to the second destination device. A synchronization controller is configured to control each DMA control circuit to independently transfer the chunk of data, and receives a signal indicating that both DMA control circuits have finished transferring the corresponding chunk of data. The synchronization controller then transfers of a next chunk of data only when both DMA control circuits have finished transferring the corresponding chunk of data.

22 Claims, 6 Drawing Sheets

METHOD AND APPARATUS FOR DMA TRANSFER WITH SYNCHRONIZATION OPTIMIZATION

RELATED APPLICATIONS

This application claims priority under 35 U.S.C. §119(e) to U.S. Provisional Patent Application No. 61/731,331 filed Nov. 29, 2012, the entire content of which is hereby incorporated by reference.

TECHNICAL FIELD

This application relates generally to data transfer between source devices and destination devices, and more specifically to circuits and methods for optimizing direct memory access (DMA) transfers with parity checking.

BACKGROUND

Direct memory access (DMA) is typically used for data transfers from a single source to a single destination. In known computer systems, a DMA controller takes control of the system bus from the central processor, and transfers a block of data between a source and a destination, typically between memory and a peripheral device, using much less bandwidth and in a shorter amount of time than if the central processor executed the transfer.

However, in some systems, logical operations must be performed on the data to be transferred, which operations may be required for data integrity. Such operations may include exclusive OR (XOR) operations, parity generation, checksum generation, and the like. For example, a XOR operation is required in data transfers using Redundant Array of Identical Disc (RAID) systems, and in particular, in the RAID-5 systems.

Some known systems utilize two or more DMA channels to handle data transfer and the associated logical operation. For example, in such systems a first DMA controller may transfer data from the source to a first destination, such as the host, while a second DMA controller may handle data transfer from the same source to a second destination, where a logical operation is performed on the data.

However, the second DMA channel and its associated logical processing places a burden on the system, and may significantly impact the transfer rate because in known systems it is difficult or impossible to perform the second DMA operation on-the-fly without adding significant delay to the data transfer. As a worst case scenario, use of two DMA channels may double the time required to transfer the data. Even if the transfer speed is not impacted by a factor of two, known systems nonetheless experience significant reductions in transfer speed when a second DMA channel competes for data from a common source.

In addition, when DMA is used to transfer data in systems using a PCI Express ("PCIe" or Peripheral Component Interconnect Express) protocol, which is a high-speed serial data transfer protocol commonly used in personal computers, two main constraints are introduced that render known systems disadvantageous. First, the DMA transfer should be aware of the maximum data payload size constraint for each data transfer, as set forth by the PCIe standard. Second, once the DMA data transfer has started in a PCIe compliant system, there is no data flow control mechanism inherent in the PCIe protocol that provides adequate arbitration. In such systems, once begun, the DMA transfer must run to completion, which typically adversely impacts transfer speed.

Some known systems use a pipeline approach to perform DMA and logical operations, such as parity checking and the like, where first, the logical operation is performed on a portion of the data, and when such a logical operation is completed, the data can then be transferred by the other DMA device to the host, for example, However, this pipeline approach increases the transfer latency when smaller data transfers are involved. Further, this approach is inefficient.

Memory devices, such as for example, the flash memory devices and other memory devices mentioned above, have been widely adopted for use in consumer products, and in particular, computers using PCIe protocol. Most computer systems use some form of DMA to transfer data to and from the memory.

Flash memory may be found in different forms, for example in the form of a portable memory card that can be carried between host devices or as a solid state drive (SSD) embedded in a host device. Two general memory cell architectures found in flash memory include NOR and NAND. In a typical NOR architecture, memory cells are connected between adjacent bit line source and drain diffusions that extend in a column direction with control gates connected to word lines extending along rows of cells. A memory cell includes at least one storage element positioned over at least a portion of the cell channel region between the source and drain. A programmed level of charge on the storage elements thus controls an operating characteristic of the cells, which can then be read by applying appropriate voltages to the addressed memory cells.

A typical NAND architecture utilizes strings of more than two series-connected memory cells, such as 16 or 32, connected along with one or more select transistors between individual bit lines and a reference potential to form columns of cells. Word lines extend across cells within many of these columns. An individual cell within a column is read and verified during programming by causing the remaining cells in the string to be turned on so that the current flowing through a string is dependent upon the level of charge stored in the addressed cell.

NAND flash memory can be fabricated in the form of single-level cell flash memory, also known as SLC or binary flash, where each cell stores one bit of binary information. NAND flash memory can also be fabricated to store multiple states per cell so that two or more bits of binary information may be stored. This higher storage density flash memory is known as multi-level cell or MLC flash. MLC flash memory can provide higher density storage and reduce the costs associated with the memory. The higher density storage potential of MLC flash tends to have the drawback of less durability than SLC flash in terms of the number write/erase cycles a cell can handle before it wears out. MLC can also have slower read and write rates than the more expensive and typically more durable SLC flash memory. Memory devices, such as SSDs, may include both types of memory.

SUMMARY

A DMA control circuit provides "on-the-fly" DMA transfer with increased speed and efficiency, in particular, in systems that include DMA transfer to RAID or RAID-5 compliant peripheral devices. DMA transfer according to certain embodiments decreases page read latency and decreases the amount of RAM require for extra pipeline stages.

According to one aspect of the invention, a DMA optimization circuit optimizes DMA data transfer on a computer bus, from a single source device to a plurality of destination devices. A first DMA control circuit is configured to transfer data from the source device to a first destination device, and a second DMA control circuit is configured to transfer data from the source device to a second destination device, and is further configured to perform a logical operation on the data transferred to the second destination device.

A synchronization controller is operatively coupled to the first DMA control circuit and to the second DMA control circuit, and is configured to synchronize transfer of a payload of data from the source device to both the first and second destination devices. The synchronization controller is configured to divide the payload of data into a plurality of chunks of data and control each DMA control circuit to facilitate the transfer of each chunk of data by the respective DMA control circuit.

The synchronization controller initializes each DMA control circuit in an identical manner, and controls each DMA control circuit to begin data transfer at the same time such that the first DMA control circuit and the second DMA control circuit transfer the chunk of data without intervention by the synchronization controller, and provide a signal to the synchronization circuit indicating that both DMA control circuits have finished transferring the corresponding chunk of data. When both DMA control circuits have finished transferring the corresponding chunk of data, the synchronization controller facilitates transfer of a next chunk of data until all chunks of data of the payload of data have been transferred by the first and second DMA controllers.

Other methods and systems, and features and advantages thereof will be, or will become, apparent to one with skill in the art upon examination of the following figures and detailed description. It is intended that the scope of the invention will include the foregoing and all such additional methods and systems, and features and advantages thereof.

BRIEF DESCRIPTION OF THE DRAWINGS

The components in the figures are not necessarily to scale, emphasis instead being placed upon illustrating various aspects thereof. Moreover, in the figures, like referenced numerals designate corresponding parts throughout the different views.

DETAILED DESCRIPTION

Figure 1:
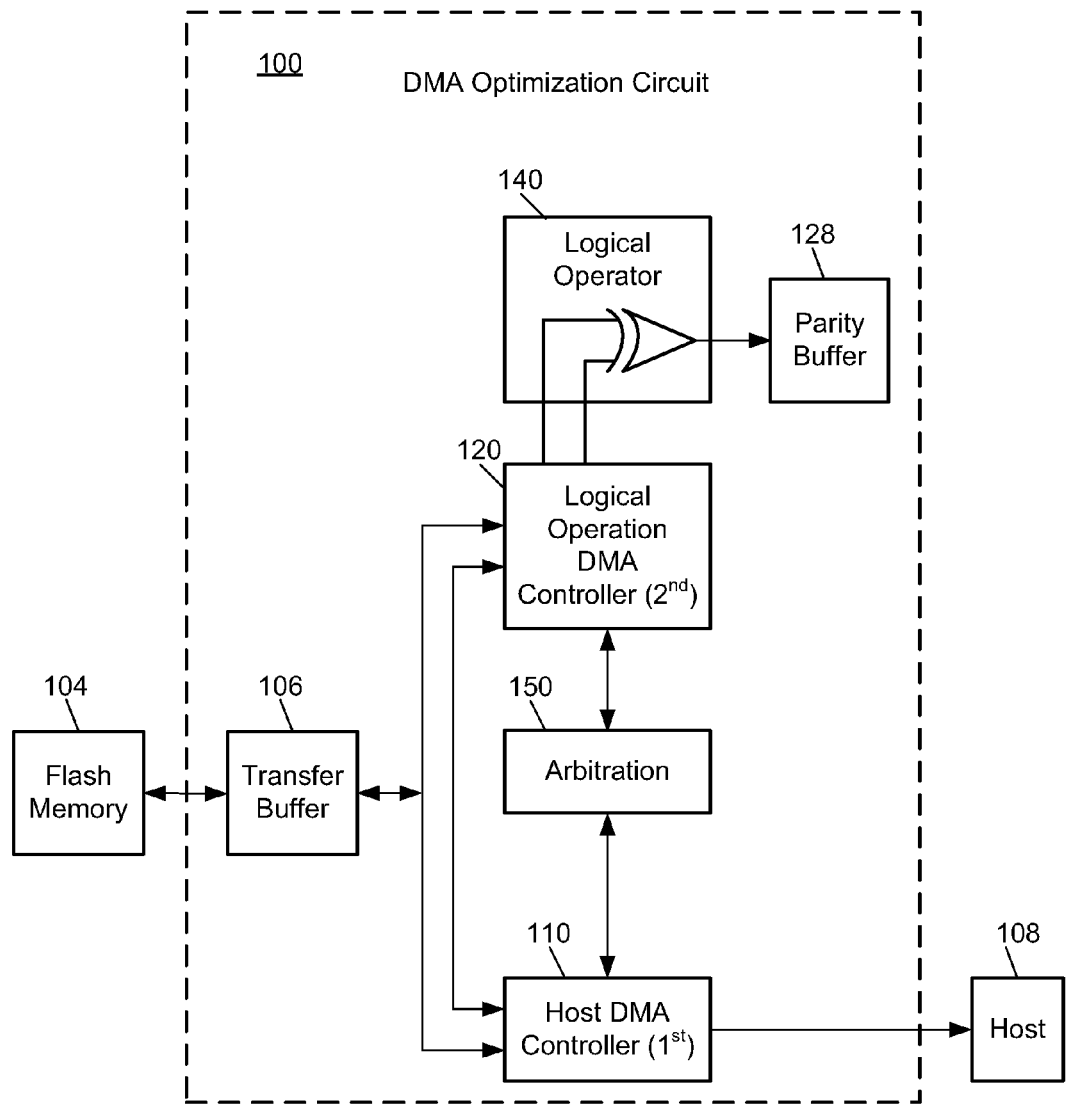
FIG. 1 is a high-level block diagram of a specific embodiment of a circuit for DMA transfer and synchronization.

FIG. 1 is a high-level block diagram showing one embodiment of an circuit 100 for optimizing and synchronizing DMA transfers (DMA optimization circuit). A flash memory circuit 104 contains source data to be transferred, and is operatively coupled to a source buffer or transfer buffer 106. A host device or first destination device 108 may receive the data transferred from the transfer buffer 106. Note that data transfer may be bidirectional in nature as between the transfer buffer 106 and the host 108. However, because embodiments of this invention are primarily directed to DMA transfers from a common source, namely the transfer buffer 106, to two separate destination devices, namely the host 108 and the parity buffer 128, the description and drawings will refer generally to DMA transfers in one direction, namely from the transfer buffer 106 to the host 108 and the parity buffer 128.

A first DMA control circuit or host DMA controller 110 facilitates the data transfer data from the transfer buffer 106 to the host 108. A second DMA control circuit or logical operation DMA controller 120 facilitates the data transfer data from the transfer buffer 106 to a second destination device, which for example in one embodiment, may be a parity buffer 128. Thus, the first DMA controller 110 and the second DMA controller 120 essentially compete for the same common data resource, namely the transfer buffer 106, to accomplish the respective data transfer.

A logical operation circuit 140 may be coupled between the second DMA controller 120 and the parity buffer 128. The logical operation circuit 140 may perform a logical operation on the data transferred to the parity buffer 128. The logical operation circuit 140 may be part of or integrated into the second DMA controller 120, or may be a separate and independent circuit. The logical operation circuit 140 may perform various logical operations, such as an XOR operation, an OR operation, a NOT operation, an AND operation, a parity operation, a checksum operation, and the like, or any logical operation required by the particular application necessary to insure data integrity or to comply with other parametric requirements.

Note that data from the transfer buffer 106 cannot be simultaneously transferred by multiple DMA controllers at the same time due to bus control and arbitration issues because the transfer buffer 106 is a single physical component. Such access and data transfer is not analogous to the situation where an output of a digital gate, such as an OR gate, feeds or sources multiple inputs of other gates to which it is connected. In this non-analogous discrete gate example, the main consideration is whether output of the gate can source and sink the required current so that all relevant voltages levels are properly maintained, which is not the case in this situation.

In that regard, to resolve contention between the first DMA controller 110 and the second DMA controller 120, an arbitration circuit 150 may be operatively coupled to the first DMA controller 110 and to the second DMA controller 120. The arbitration circuit 150 may be configured to synchronize data transfer from the transfer buffer 106 to both the host 108 and the parity buffer 128.

Figure 2:
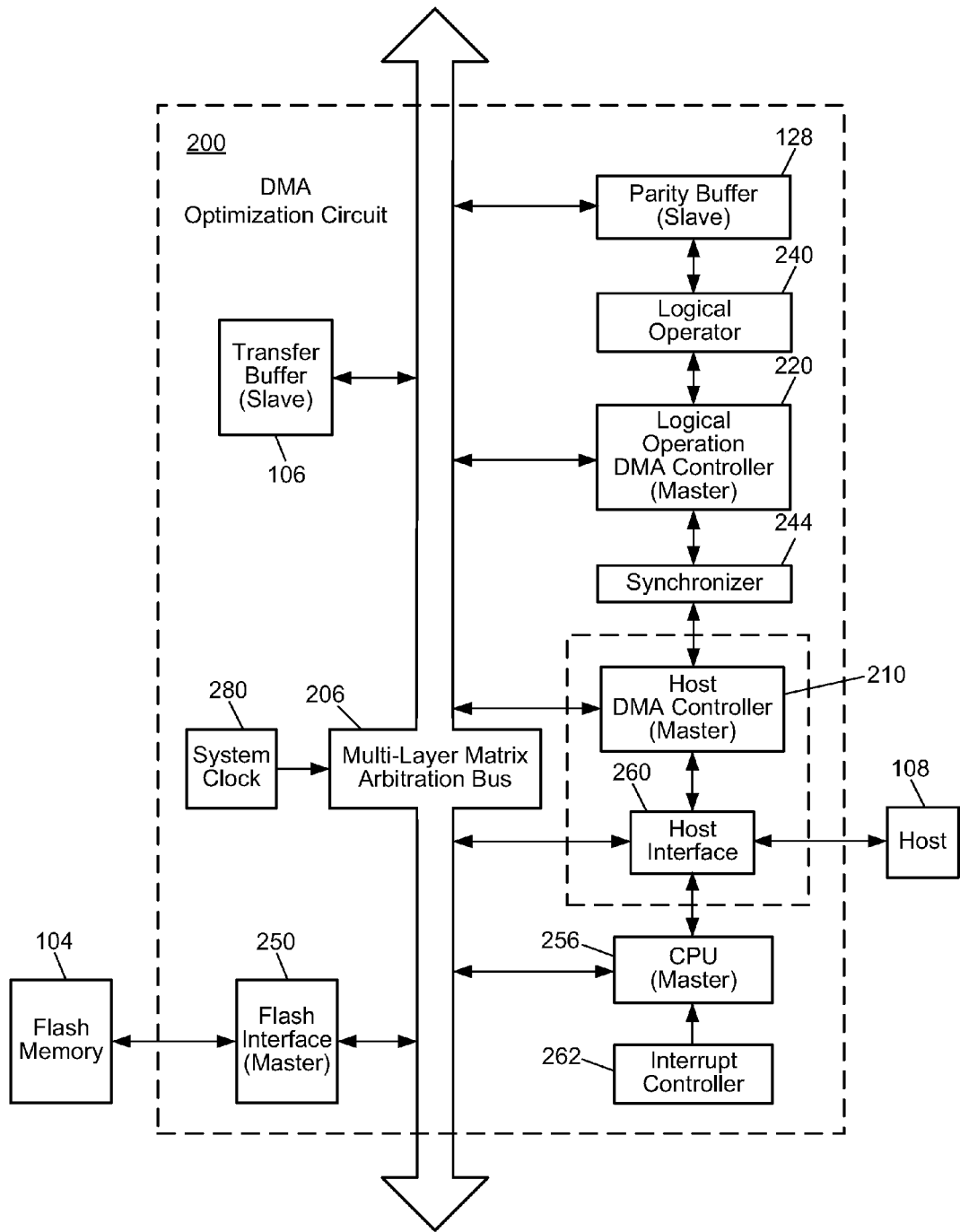
FIG. 2 is a block diagram of a specific embodiment of a circuit for DMA transfer and synchronization.

FIG. 2 shows a DMA optimization and synchronization circuit 200 according to one embodiment in an specific computer system bus environment. In this system environment, a multi-layer matrix bus 206 may be used where multiple devices may be interconnected. Although not shown in the drawings, a multi-layer matrix bus controller 206 directs and controls the operation of all components connected to the multi-layer matrix bus 206. In such a multi-layer system, such as is present in PCI Express compliant systems, multiple "clients," and possibly tens of clients and may be interconnected. Accordingly, tens of DMA channels, DMA controllers, and processors may also be interconnected.

As shown in FIG. 2, a host DMA controller 210 facilitates the data transfer data from the transfer buffer 106 to the host 108. A second DMA controller or logical operation DMA controller 220 facilitates the data transfer from the transfer buffer 106 to a second destination device, which for example in one embodiment, may be the logical operation buffer or parity buffer 128.

The first DMA controller 110 and the second DMA controller 120 may be operatively coupled to the multi-layer matrix arbitration bus 206, and essentially compete to transfer data between the transfer buffer 106 and the host 108 and/or the parity buffer 128.

In one embodiment, a logical operator circuit 240 may be coupled between the second DMA controller 220 and the parity buffer 128. The logical operation circuit 240 may perform a logical operation on the data transferred to the parity buffer 128. The logical operation circuit 240 may perform various logical operations, such as an XOR operation, a parity operation, a checksum operation, and the like, or any logical operation required by the particular application necessary to insure data integrity or comply with other parametric requirements.

A synchronization circuit 244 may be operatively coupled between the host DMA controller 210 and the logical operation DMA controller 220, and may also operatively coupled to the multi-layer matrix arbitration circuit 206. The synchronization circuit 244, in conjunction with the multi-layer matrix arbitration bus 206, may provide appropriate signaling and control to the first DMA controller 110 and the second DMA controller 120 to optimize DMA transfer operations and synchronize data transfer. Note that the synchronization and control provided by the synchronization circuit 244 is a separate from other synchronization and arbitration provided by the multi-layer matrix arbitration bus 206.

A flash memory interface 250 may be coupled between the flash memory 104 and the multi-layer matrix arbitration bus 206 to provide ease of control and access. Similarly, a host interface 260 may be coupled between the host 108, the host DMA controller 210, and the multi-layer matrix arbitration bus 206. A processor 256, which may be one of many processors in the PCI Express system configuration, may be coupled to the host interface 260. The processor 256 may be interrupt driven based on signals provided by an interrupt controller 262.

The various circuits or components in FIG. 2 may be labeled as "master" or "slave" to provide a general indication as to which component initiates a request for a data transfer. Typically, a master device initiates a request for data transfer while the slave device is the target of the data transfer request. Note that all operations are essentially synchronous and are based on input from a system clock 280, and that the direction of the data transfer can be from the slave device to the master device or from the master device to the slave device, depending upon the operation being performed.

Figure 3:
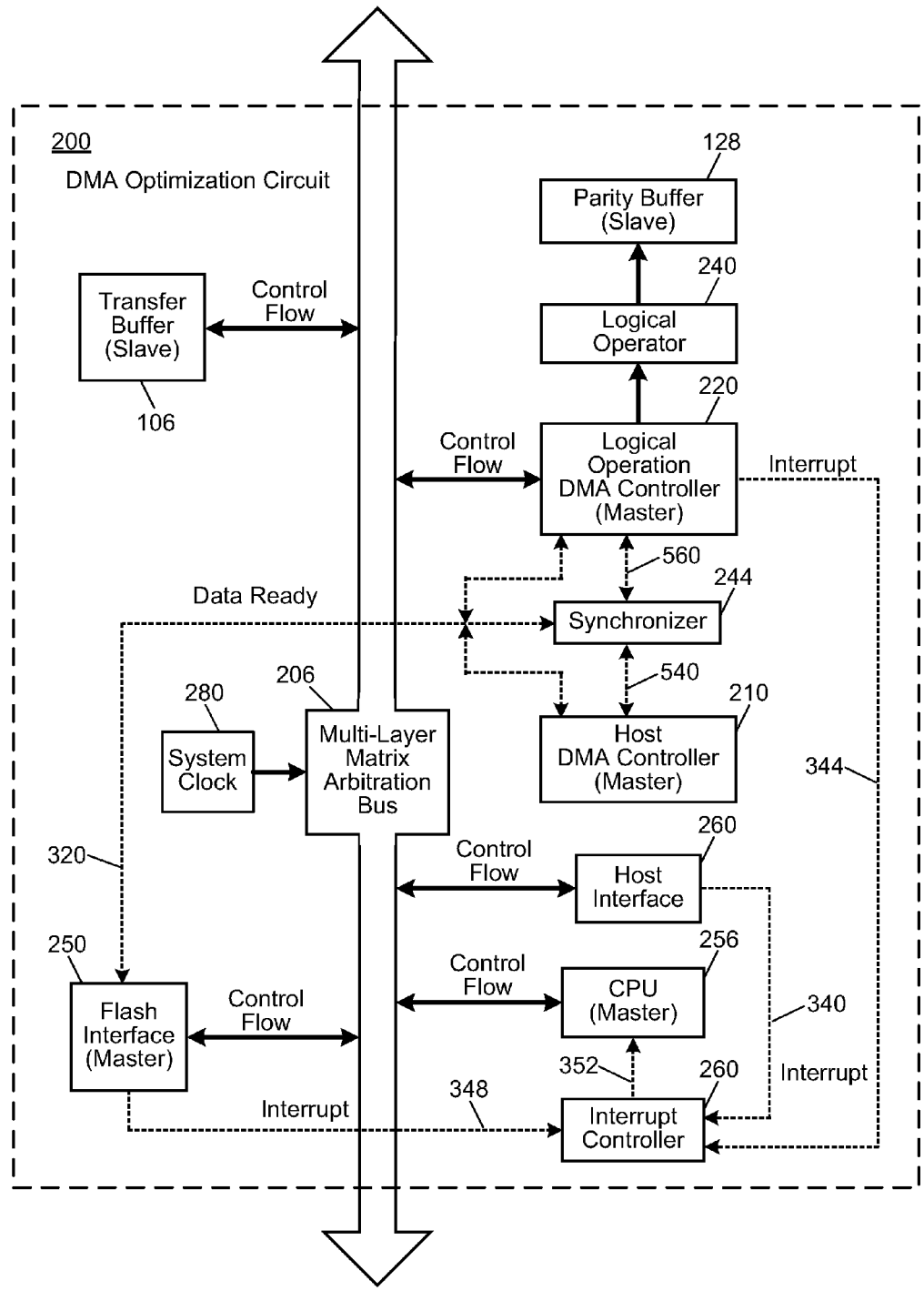
FIG. 3 is a block diagram of the circuit for DMA transfer and synchronization shown in FIG. 2.

FIG. 3 is similar to the block diagram of FIG. 2 but includes a further indication of control flow. Various interrupt signals and synchronization signals are shown as dashed lines, described below.

The synchronization circuit 244 effects synchronization between the host DMA controller 210 and the logical operation DMA controller 220, by way of various control signals, and also communicates with the source device, namely, the transfer buffer 106, through the multi-layer matrix arbitration bus 206.

A data ready signal 320 is coupled between the synchronization circuit 244 and the flash interface 256 and indicates that the data saved in the transfer buffer 106 is ready to be transferred. This signal is received by both the host DMA controller 210 and the logical operation DMA controller 220, or may be received by the synchronization circuit 244.

The interrupt controller 262 may receive a first interrupt signal 340 from the host interface 260, and may also receive a second interrupt signal 344 from the logical operation DMA controller 220. Further, the flash interface 250 may provide a third interrupt signal 348 to the interrupt controller 262. The interrupt controller 262, in turn, provides an fourth interrupt signal 352 to the CPU 256.

Synchronization of the host DMA controller 210 and the logical operation DMA controller 220 will be described below operationally. The synchronization circuit 244 is configured to initialize the host DMA controller 210 and the logical operation DMA controller 220 in an identical manner. Data parameters, such as data source address, data destination address and size of data to be transfer, are provided to each DMA controller, for example, by the processor 256 or other control device. Because each DMA channel is controlled in an identical manner, the size of the data transfer for both DMA channels is set to an identical value.

Further, the synchronization circuit 244 may control the host DMA controller 210 and the logical operation DMA controller 220 to begin data transfer at the same time. To optimize the DMA transfers, the data to be transferred is divided to a plurality of small "chunks" of data. In one embodiment, the PCI Express protocol requires that the maximum payload or maximum size of the data block to be transferred is limited to 4K bytes. However, this value may change depending upon the particular application and PCI Express customization. For example, in other embodiments, the maximum payload size may be 128 bytes to 4K bytes. Note that the synchronization circuit 244 may assign or divide the data into the plurality of chunks of data, or the processor 256 or other suitable component may assign the chunk size.

Note that when the entire data transfer of a chunk of data is completed, the DMA controllers 110, 120 inform the processor 256, via an interrupt mechanism. In one embodiment, the parity buffer 128 may have two assigned ports (not shown). The first assigned port is for the logical operation DMA controller 220 to read the data from the parity buffer, while the second assigned port receives data written from the logical operation DMA controller 220. Thus, the data can be provided to the host along with or combined with the results of the logical operation, such as parity checking.

As described above, if the host DMA controller 210 and the logical operation DMA controller 220 were allowed to compete for bus control to transfer the entire 4K byte payload of data (or other designated maximum block size) without special synchronization, such a transfer would be inefficient and relatively slow due to bus contention, timing issues, and overhead constraints.

Because the PCI Express protocol is a "packet" based protocol, meaning that various headers are used to provide control and command information, the overhead associated with the headers increases in a non-linear manner as the size of the data block increases, thus contributing to the inefficiency of transferring large blocks of data. Such packet protocol should not be confused with communication-type packets, such as those used in TCP/IP protocol, which is wholly unrelated.

According to the embodiment of FIGS. 2-3, each block of data, for example, the 4K byte block of data corresponding to the maximum payload size, is divided into a plurality of smaller chunks of data. For example, in a preferred embodiment, each 4K byte block of data may be divided into chunks of 1K bytes. However, any suitable level of granularity may be used. For example, the 4K byte block of data may be divided into two to sixteen chunks of data, with each chunk being equal in size.

After the host DMA controller 210 and the logical operation DMA controller 220 are provided with the data source address, the data destination address and size of the chunk of data, the synchronization circuit directs the DMA operation to begin. The host DMA controller 210 and the logical operation DMA controller 220 begin their respective DMA transfer at exactly the same time and communicate with each other to determine when both are finished transferring the 1K byte chunk of data. Note that the synchronization circuit 244 may receive separate indications from each DMA controller indicating that the respective data transfer is complete, or may receive a single signal indicating that both DMA controllers have completed the transfer.

In that regard, the host DMA controller 210 waits for the logical operation DMA controller 220 to complete its transfer, while the logical operation DMA controller 220 also waits for the host DMA controller 210 to complete its transfer. Most likely, the host DMA controller 210 transfers data at a higher speed than the logical operation DMA controller 220 due, in part, to the additional processing that must be performed by the logical operation DMA controller 220 or its associated logical operation circuit, such as XOR, parity operations and the like.

During the transfer of a particular chunk of data, the synchronization circuit 244 need not intervene, supervise, nor provide direct control to the host DMA controller 210 or the logical operation DMA controller 220. Rather, the host DMA controller 210 and the logical operation DMA controller 220 internally handle and coordinate the transfer of a single 1K byte chunk of data without external control by the synchronization circuit 244, and continue the DMA transfer from start to completion.

Note that the above description regarding the 1K byte of data is based on a logical level. In contrast, on the physical level, the multi-layer matrix arbitration bus 206 may provide other synchronization and arbitration to maximize performance. For example, the multi-layer matrix arbitration bus 206 may further divide the 1K byte chunk of data into small blocks of 32 bytes, and may further arbitrate bus control of the transfer buffer 106 between the host DMA controller 210 and the logical operation DMA controller 220. However, such operations by the multi-layer matrix arbitration bus 206 are completely seamless and "invisible" to the host DMA controller 210, the logical operation DMA controller 220, or the synchronization circuit 244.

With respect to the multi-layer matrix arbitration bus 206, because in some embodiments, there are many clients (master and slave devices) in a SoC design (System On a Chip), an efficient way is needed to arbitrate between the various requests by the masters. The multi-layer matrix arbitration bus 206 provides such efficient arbitration. For example, two master devices may attempt to access two separate slaves, and no arbitration may be needed. In this case, the multi-layer matrix arbitration bus 206 may pass the requests forward.

However, if two masters trying to access a single slave device, such access cannot be performed simultaneously. In that case, the multi-layer matrix arbitration bus 206 may arbitrate between the two requests by allowing only one master at a time to access the common device. Such arbitration may be made on a timed basis, but in a preferred embodiment, efficiency is increased if the arbitration is based on the data size.

After both the host DMA controller 210 and the logical operation DMA controller 220 have completed transfer of the chunk of data from the transfer buffer 106 to the respective destination devices, the synchronization circuit 244 then directs transfer of the next chunk of data, until all of the chunks of data have been transferred from the transfer buffer 106.

In a well-balanced system, for example, where a shared bus can sustain the bandwidth required by three DMA controllers, embodiments of this invention provide that contention delay is minimized to only several clock cycles instead of a pipeline stage page, as would be required by known systems.

Figure 4:
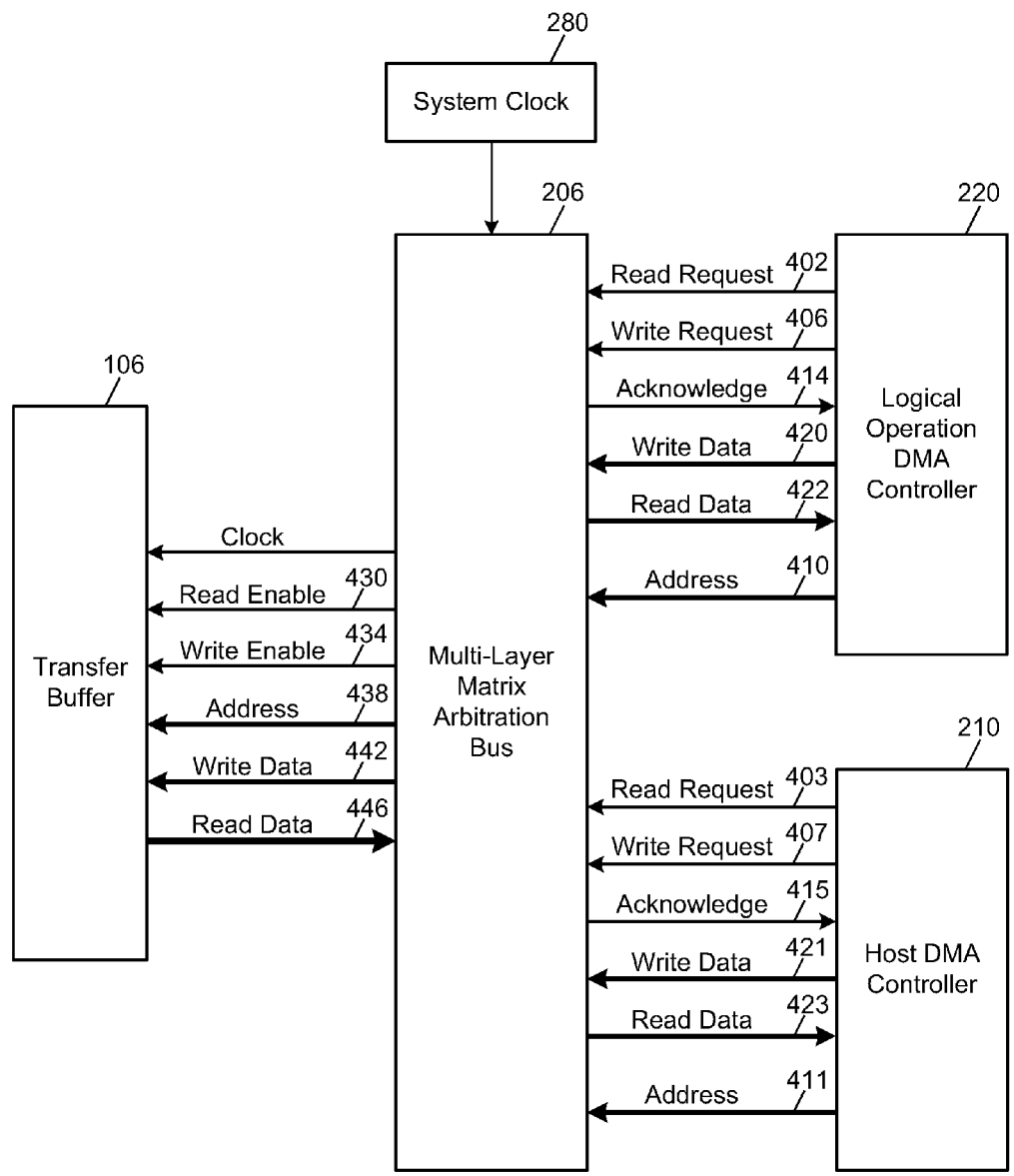
FIG. 4 is a block diagram showing control signals in a specific embodiment implementing a multi-layer matrix arbitration bus.

FIG. 4 is a block diagram showing on specific embodiment of the multi-layer matrix arbitration bus 206 and certain control signals that may be used to synchronize access between the transfer buffer 106, and the host DMA controller 210 and the logical operation DMA controller 220. Note that in FIG. 4, the direction of the arrowhead indicates the direction of the control or the dataflow, while the thicker lines indicate a bus configuration.

In operation, when a master device, such the host DMA controller 210 or the logical operation DMA controller 220 wishes to access the transfer buffer 106, it asserts either a read request signal 402 (403) or a write request signal 406 (407), depending whether the operation is a read or a write, along with a relevant address 410 (411). The respective DMA controller 210, 220 then waits for an acknowledge signal 414 (415) from the multi-layer matrix arbitration bus 206. One clock cycle after the acknowledge signal 414 (415) is received from the multi-layer matrix arbitration bus 206, the respective master device (210, 220) may drive a write data bus signal 420 (421), in the case of a write request, or may capture data from a read data bus 422 (423), in the case of a read request.

If more data is to be transferred by the respective master device (210, 220), that master device may maintain the corresponding request signal active. The multi-layer matrix arbitration bus 206 is configured to select the appropriate master device (210, 220) according to the particular arbitration scheme implemented. In a preferred embodiment, the multi-layer matrix arbitration bus 206 arbitrates in accordance with round-robin scheme. However, other schemes may be implemented.

To effect the data transfer and synchronization between the host DMA controller 210 and the logical operation DMA controller 220, the multi-layer matrix arbitration bus 206 may control various signals coupled to the transfer buffer 106 through the multi-layer matrix arbitration bus, including a read enable signal 430, a write enable signal 434, an address 438, a write data signal 442 and a read data signal 446.

Referring to FIG. 4 in conjunction with FIG. 3, a simple data transfer will now be described below, such as a read operation by the host DMA controller 210 without competition from the logical operation DMA controller 220. In such a simple read operation example, the flash interface 250 reads data from the flash memory 104 and stores the data in the transfer buffer 106. The flash interface 250 then notifies the host interface 260 that the data in the transfer buffer 106 is ready by asserting the data ready signal 320.

The host interface 260 then reads the data from the transfer buffer 106 by asserting the read data signal 423 and transfers the data to the host 108. In a preferred embodiment, physically, there is a single transfer buffer 106, and the multi-layer matrix arbitration bus 206 arbitrates between various master devices competing for access to the transfer buffer 106.

The multi-layer matrix arbitration bus 206 allows the physical access from two master devices to a single slave device, namely, the transfer buffer 206. Concurrently, the synchronization circuit 244 performs synchronization between the host DMA controller 210 and the logical operation DMA controller 220 based on each chunk of data, for example, in one embodiment, on a boundary of a 1K byte chunk of data.

Next, a more complex data transfer example will now be described below, such as a read operation by the host DMA controller 210 with competition from the logical operation DMA controller 220. First, the flash interface 250 obtains data from flash memory 104 and stores the data in the transfer buffer 106. The flash interface 250 then notifies both the host interface 260 and the logical operation DMA controller 220 that the data in the transfer buffer 106 is ready by asserting the data ready signal 320. In this example however, both the host interface 260 via the host DMA controller 210, and the logical operation DMA controller 220, would now attempt to read the data from the transfer buffer.

In that regard, when access and synchronization are provided by the synchronization circuit 244 and the multi-layer matrix bus 206, the host interface 260, via the host DMA controller 210, performs the transfer of the data to the host. Similarly when such access and synchronization are provided, the logical operation DMA controller 210 performs the transfer of the data to parity buffer 128, and further performs the required logical operation, such as an XOR operation, in one embodiment. As set forth above, any logical operation may be performed depending on the application, such as XOR, parity generation, checksum generation, and the like.

For example, assume that that the transfer buffer 106 has received 16K bytes of data to transfer. Accordingly the 16K bytes of data are divided into four chunks of data, with each chunk being 4K bytes in size, which corresponds the maximum payload size in certain embodiments that implement the PCI Express protocol. Both the host interface 260, via the host DMA controller 210, and the logical operation DMA controller 220 may be simultaneously requesting access to the transfer buffer 106 via the multi-layer matrix arbitration bus 206, but neither device is "aware" of the request by the other device.

In known PCI Express configurations, the multi-layer matrix arbitration bus 206 grants bus access on very small blocks of data, for example, 32 byte blocks, as described above. However, in accordance with certain embodiments, the host interface 260 or the host DMA controller 210 and the logical operation DMA controller 220 are "aware" of each other only at the 1K byte data boundaries, which is the point where the host interface 260 and the logical operation DMA controller 220 synchronize with each other.

Thus, both the host DMA controller 210 and the logical operation DMA controller essentially compete for access to the same resource, namely the transfer buffer 106, under arbitration control by the multi-layer matrix arbitration bus 206 based on the much smaller data transfer granularity (for example, 32 bytes blocks). However, embodiments of the DMA optimization circuit and method 200 ensures that the host DMA controller 210 and the logical operation DMA controller 220 synchronize at the 1K byte data boundary.

Accordingly, data transfer is optimized in two ways. First, data transfer is optimized via the efficient arbitration mechanism of multi-layer matrix arbitration bus 206 operating on small data blocks, for example, 32 byte data blocks. Second, data transfer is optimized via the synchronization circuit 244 to synchronize the host DMA controller 210 and the logical operation DMA controller 220 at 1K byte data boundaries.

Figure 5:
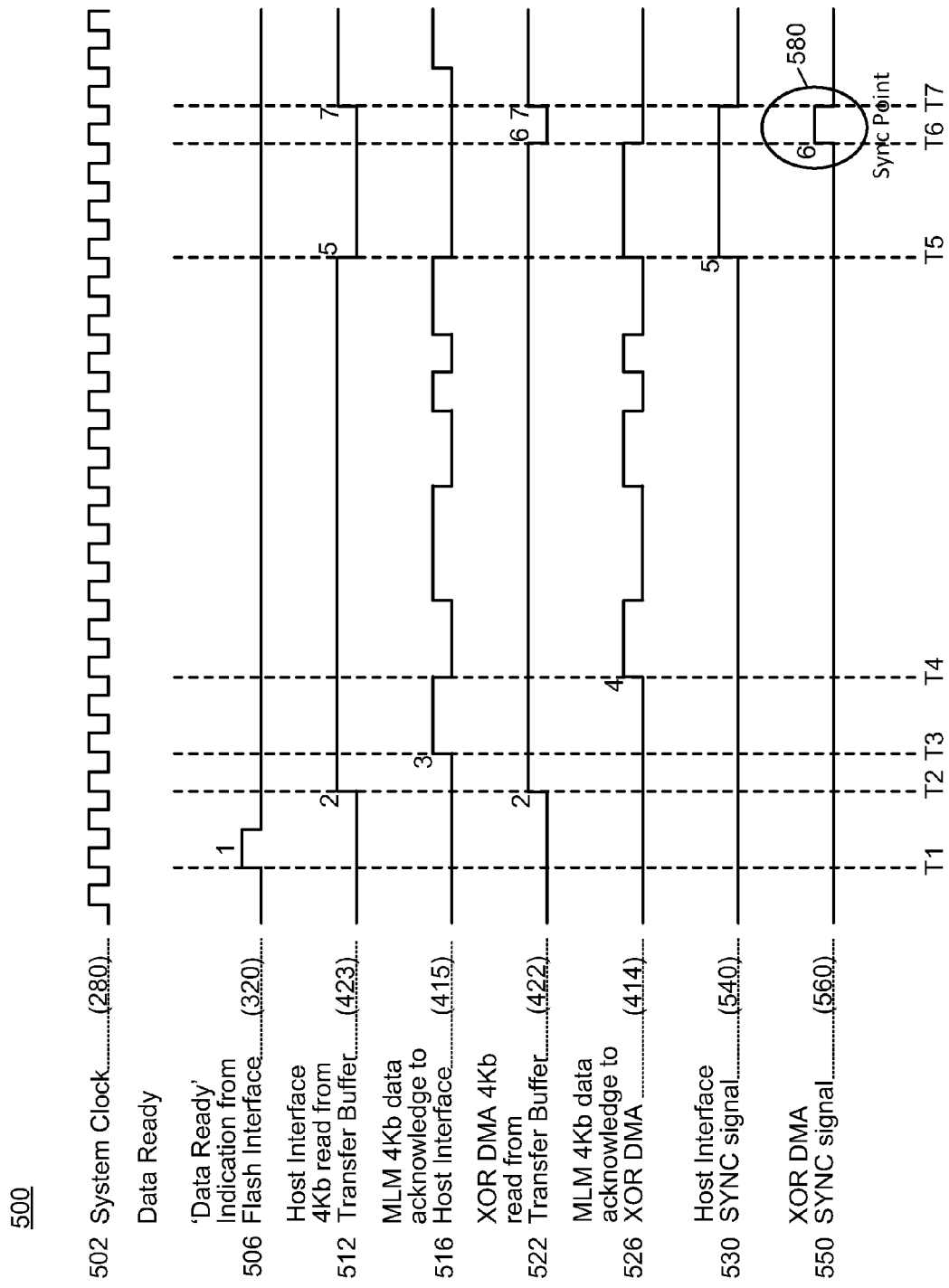
FIG. 5 is a timing diagram showing competing DMA requests.

Turning now to FIGS. 3-5, FIG. 5 is a simplified timing diagram 500 showing the timing of eight signals to effect synchronization and DMA transfer. The first graph 502 shows the system clock 280. The second graph 506 shows the data ready signal 320 from the flash interface 250. The third graph 512 shows the host DMA controller read data signal 423 to facilitate reading data from the transfer buffer 106. The fourth graph 516 shows the acknowledge signal 415 provided by the synchronization circuit 244 to the host DMA controller via the multi-layer matrix arbitration bus 206.

The fifth graph 522 shows read data signal 422 from the logical operation DMA controller 220 to facilitate reading of data from the transfer buffer 106. The sixth graph 526 shows the acknowledge signal 414 provided by the synchronization circuit 244 to the logical operation DMA controller via the multi-layer matrix arbitration bus 206. The seventh graph 530 shows a host interface or host DMA controller sync signal 540, while the eight graph 550 shows a logical operation DMA controller sync signal 560.

In FIG. 5, time is shown increasing toward the right on the horizontal axis, and indicates specific events, labeled T1 through T6. The action with respect to each time event will now be described.

At time=T1, the flash interface 250 has finished copying the data into the transfer buffer 106, and asserts the data ready signal 320 to indicate that the data is ready for transfer.

At time=T2, both the host interface 260 via the host DMA controller 210 and logical operation DMA controller 220 assert arbitration requests (402 and 403) to the multi-layer matrix arbitration bus 206 so as to obtain access to the transfer buffer 106. At this time the multi-layer matrix arbitration bus 206 is handling arbitration exclusive of operations being performed by the synchronization circuit 244.

At time=T3, the multi-layer matrix arbitration bus 206 performs an internal arbitration process. For example, in one embodiment, a round-robin arbitration scheme may be implemented, which allows data to flow from the transfer buffer 106 to the host interface 260. Such data flow is the transfer of data in the 32 byte block described above, which is under control of the multi-layer matrix arbitration bus 206.

At time=T4, as part of the multi-layer matrix arbitration bus 206 round-robin arbitration scheme, data is allowed to flow from the transfer buffer 106 to the logical operation DMA controller 220. Note that data is not permitted to flow in a truly simultaneously manner to both the host interface 260 and the logical operation DMA controller 220. Rather, the destination devices "take turns" receiving the data from the transfer buffer 106 based on the priority scheme, such as for example, the round-robin scheme implemented by the multi-layer matrix arbitration bus 206. In other embodiments, different types of round-robin schemes may be used. For example, a time slice scheme may be used, or in some SoC implementations, the round-robin scheme may be based on the number of bytes of data transferred to and from the master device, as in the preferred embodiment.

At time=T5, for example, assume that the host interface 260 has completed transferring the 1K byte chunk of data before the logical operation DMA controller 220 has completed its transfer. Accordingly, host interface 260 negates its request to the multi-layer matrix arbitration bus 206 by de-asserting the read request signal 403 and at the same time, asserting the sync signal 540.

At time=T6, however, the host interface 260 will not request transfer of a new 1K byte chunk of data until the logical operation DMA controller 220 completes its corresponding transfer of the same 1K byte chunk of data, and thus asserts its corresponding sync signal 560.

At time=T7, when both of the sync signals 540 and 560 have been asserted, the host interface 260 and the logical operation DMA controller can request transfer of the next 1K byte chunk of data by again asserting the read request signals 402 and 403 to the multi-layer matrix arbitration bus so as to again obtain access to the transfer buffer 106.

Accordingly, arbitration and synchronization sync point between the host interface 260 or the host DMA controller 210, and the logical operation DMA controller 220, is shown from time=T6 to time=T7, as highlighted by the circled area 580 of the graph 550.

Figure 6:
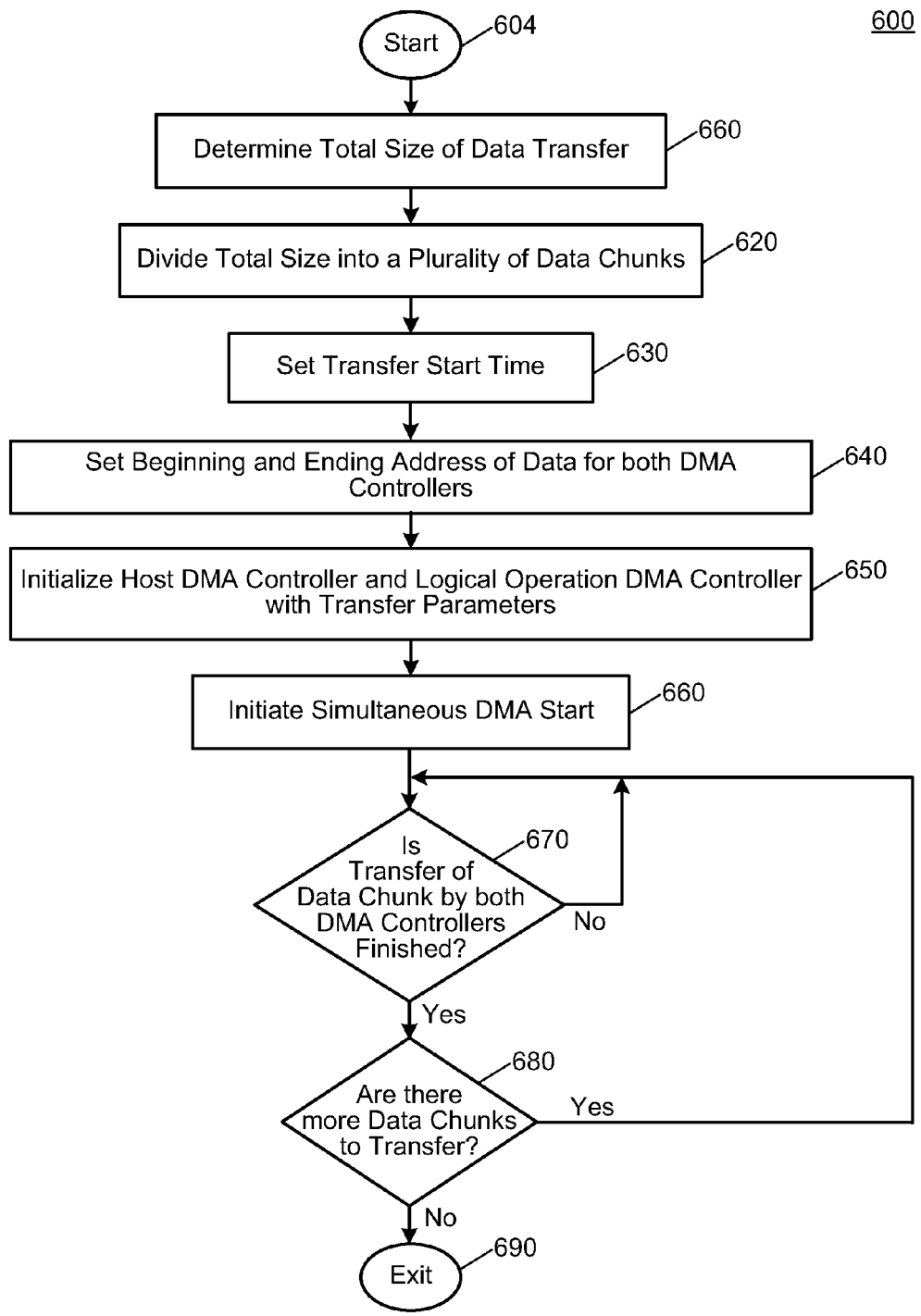
FIG. 6 is a flowchart showing DMA transfer and synchronization.

FIG. 6 is a flowchart 600 showing operational aspects of the DMA optimization circuit 200. At step 604 the routine begins and the total size of the data transfer is determined 610. The total size of the data transfer is then divided into a plurality of smaller chunks of data 620. The synchronization circuit then sets the start time for the DMA transfer 630. The beginning address and the ending address of the data to be transferred are also set identically for each DMA controller 640, since the source device is the same physical component, namely the transfer buffer 106.

The synchronization circuit or the processor initializes is the host DMA controller and the logical operation DMA controller with the transfer parameters required 650. Next, each DMA controller is initialized to begin a simultaneous data transfer 660. Note that during the transfer of a single chunk of data, neither DMA controller is "aware" of the other DMA controller, or that contention for bus access exists. As described above, arbitration of the bus to resolve contention issues during transfer of data is handled by the multi-layer matrix arbitration bus. In that regard, the DMA controllers are only "aware" of each other at the boundary of the transfer of a single chunk of data. Accordingly, the synchronization controller waits for a signal from each DMA controller indicating that the corresponding data chunk transfer has been completed 670.

If the data transfer from both DMA controllers is not yet complete, the synchronization controller idles until the transfer is complete. Once the synchronization controller receives an indication that both DMA controllers have completed the transfer of the single chunk of data, the synchronization controller checks to determine if additional chunks of data are to be transferred 680. If no additional data checks are to be transferred, the routine exits 690. If additional data chunks are available to be transferred, the routine branches to step 670 to facilitate the transfer of the next data chunk.

Although the invention has been described with respect to various system and method embodiments, it will be understood that the invention is entitled to protection within the full scope of the appended claims.

The invention claimed is:

1. A system for optimizing direct memory access (DMA) data transfer from a single source device to a plurality of destination devices on a computer bus, the system comprising:
   a first DMA control circuit configured to transfer a payload of data from the source device to a first destination device, the payload of data divided into a plurality of chunks of data;
   a second DMA control circuit configured to transfer the payload of data from the source device to a second destination device, and configured to perform a logical operation on the data transferred to the second destination device;
   a synchronization controller operatively coupled to the first DMA control circuit and to the second DMA control circuit, and configured to control each DMA control circuit to independently transfer the chunk of data, wherein the synchronization controller is configured to receive a signal indicating that both DMA control circuits have finished transferring the corresponding chunk of data; and
   the synchronization controller configured to facilitate transfer of a next chunk of data only when both DMA control circuits have finished transferring the corresponding chunk of data.

2. The system of claim 1, wherein the payload of data is divided into a plurality of chunks of data of equal size.

3. The system of claim 2, wherein the payload of data is divided into one or more chunks of data.

4. The system of claim 1, wherein the computer bus is a serial data bus.

5. The system of claim 4, wherein the serial data bus is a PCI Express compatible bus.

6. The system of claim 2, wherein the payload of data corresponds to a maximum payload size associated with a PCI Express bus protocol.

7. The system of claim 1, wherein the source device is a memory circuit, a flash memory circuit, a memory interface, or a flash memory interface.

8. The system of claim 1, wherein the first destination device is a host device or a host interface.

9. The system of claim 1, wherein the second destination device is buffer into which the transferred data has been processed in accordance with a logical operation.

10. The system of claim 9, wherein the logical operation is at least one of an XOR operation, an OR operation, a NOR operation, an AND operation, a NAND operation, a parity operation, and a checksum operation.

11. The system of claim 1, wherein the first DMA control circuit is configured to transfer data at a first data transfer rate, and the second DMA control circuit is configured to transfer data at a second data transfer rate, wherein the first data transfer rate is different than the second data transfer rate.

12. A system for optimizing DMA data transfer on a computer bus, from a single source device to a plurality of destination devices, the system comprising:
   a first DMA control circuit configured to transfer data from the source device to a first destination device;
   a second DMA control circuit configured to transfer data from the source device to a second destination device, and configured to perform a logical operation on the data transferred to the second destination device;
   a synchronization controller operatively coupled to the first DMA control circuit and to the second DMA control circuit, and configured to synchronize transfer of a payload of data from the source device to both the first and second destination devices;
   the synchronization controller configured to divide the payload of data into a plurality of chunks of data and control each DMA control circuit to facilitate the transfer of each chunk of data by the respective DMA control circuit;
   the synchronization controller configured to initialize each DMA control circuit in an identical manner, and control each DMA control circuit to begin data transfer at the same time such that the first DMA control circuit and the second DMA control circuit transfer the chunk of data without intervention by the synchronization controller, and provide a signals to the synchronization circuit indicating that both DMA control circuits have finished transferring the corresponding chunk of data; and
   wherein when both DMA control circuits have finished transferring the corresponding chunk of data, the synchronization controller facilitates transfer of a next chunk of data until all chunks of data of the payload of data have been transferred by the first and second DMA controllers.

13. The system of claim 12, wherein the computer bus is a serial data bus.

14. The system of claim 13, wherein the serial data bus is a PCI Express compatible bus.

15. The system of claim 14, wherein the payload of data corresponds to a maximum payload size associated with a PCI Express bus protocol.

16. The system of claim 12, wherein the source device is a memory circuit, a flash memory circuit, a memory interface, or a flash memory interface.

17. The system of claim 12, wherein the first destination device is a host device or a host interface.

18. The system of claim 12, wherein the second destination device is buffer into which the transferred data has been processed in accordance with a logical operation.

19. The system of claim 18, wherein the logical operation is at least one of an XOR operation, an OR operation, a NOR operation, an AND operation, a NAND operation, a parity operation, or a checksum operation.

20. The system of claim 12, wherein the first DMA control circuit is configured to transfer data at a first data transfer rate, and the second DMA control circuit is configured to transfer data at a second data transfer rate, wherein the first data transfer rate is different than the second data transfer rate.

21. The system of claim 12, wherein the payload of data is divided into one or more chunks of data.

22. A method for optimizing DMA data transfer on a computer bus, from a single source device to a first destination device and a second destination device, the system comprising:

dividing a payload of data into a plurality of chunks of data;
performing a logical operation on the data transferred to the second destination device;
synchronizing, using a synchronizer circuit, a transfer of a payload of data from the source device to both the first and second destination devices by controlling a first DMA control circuit to transfer data from the source device to the first destination device and by controlling a second DMA control circuit to transfer data from the source device to the second destination device;
initializing each DMA control circuit in an identical manner, and directing each DMA control circuit to begin data transfer at the same time such that the first DMA control circuit and the second DMA control circuit transfer the chunk of data;
providing signals to the synchronization circuit indicating that both DMA control circuits have finished transferring the corresponding chunk of data; and
transferring a next chunk of data only when both DMA control circuits have finished transferring the chunk of data, until all chunks of data of the payload of data have been transferred by the first and second DMA controllers.

\* \* \* \* \*